United States Patent [19]

Kupfer et al.

[11] Patent Number: 5,722,744
[45] Date of Patent: Mar. 3, 1998

[54] ROAD VEHICLE ELECTROHYDRAULIC BRAKE SYSTEM

[75] Inventors: Walter Kupfer, Weinstadt; Harry Troester, Tamm, both of Germany

[73] Assignee: Mercedes-Benz AG, Germany

[21] Appl. No.: 672,068

[22] Filed: Jun. 26, 1996

[30] Foreign Application Priority Data

Jun. 26, 1995 [DE] Germany ............... 195 23 108.2

[51] Int. Cl.⁶ .................................................. B60T 8/48
[52] U.S. Cl. ...................... 303/189; 303/10; 303/115.2; 303/162
[58] Field of Search ................. 303/189, 10, 115.2, 303/125, 162, 3, 15, 113.4, 113.2, 114.1; 364/426.01, 426.03

[56] References Cited

U.S. PATENT DOCUMENTS

| | | | |
|---|---|---|---|
| 4,687,260 | 8/1987 | Matsui et al. | 303/119.1 |
| 4,934,761 | 6/1990 | Sauvageot et al. | 303/189 |
| 5,509,729 | 4/1996 | Zaviska et al. | 303/117.1 |
| 5,597,214 | 1/1997 | Katagiri et al. | 303/10 |

FOREIGN PATENT DOCUMENTS

| | | |
|---|---|---|
| 4134427A1 | 4/1993 | Germany. |
| 4335769C1 | 12/1994 | Germany. |
| 44059181A1 | 8/1995 | Germany. |
| 2283067 | 4/1995 | United Kingdom. |

Primary Examiner—Peter M. Poon
Attorney, Agent, or Firm—Evenson, McKeown, Edwards & Lenahan, P.L.L.C.

[57] ABSTRACT

In a road vehicle electrohydraulic brake system, each wheel brake is assigned a brake-pressure regulating element which can be controlled by an electric motor. At least one electronic retardation desired-value signal transmitter is actuated by the driver. An electronic control unit produces the required actuating signals for the brake-pressure regulating elements from a comparison of the desired-value input signals with actual-value signals characteristic of the vehicle retardation. The brake-pressure regulating elements each comprises a piston pump. The filling and delivery strokes of these elements are performed in a fixed phase relationship with a pump driving element. The output of the pump per pump cycle is regulated opposite the pressure and, in all cases, is small relative to the output, $Q_{max}$, required for coupling the maximum value of the brake pressure $P_{Bmax}$ into the connected wheel brake. With the vehicle stationary and the desired-value transmitter actuated, an electrically drivable valve arrangement shuts off the brakes from the brake-pressure regulating elements and, given a reduction in the desired-value input, allows brake fluid to flow out of the brakes into individually assigned reservoir chambers.

20 Claims, 3 Drawing Sheets

ROAD VEHICLE ELECTROHYDRAULIC BRAKE SYSTEM

BACKGROUND AND SUMMARY OF THE INVENTION

The present invention relates to an electrohydraulic brake system for a road vehicle, in which each wheel brake is assigned a brake-pressure regulating element which can be activated by supplying drive signals to an electric motor and, together with the wheel brake, forms a wheel-brake circuit. At least one electronic or electromechanical signal transmitter is provided to be actuated by the driver to specify a required desired value of the retardation of the vehicle and to produce an electrical output signal correlated monotonically with the force and/or the stroke with which the driver actuates the transmitter. An electronic control unit compares the desired-value input signals with actual-value signals characteristic of the vehicle retardation, e.g. output signals of wheel-speed sensors assigned individually to the vehicle wheels, and produces the actuating signals required for rapid matching of the actual value to the target desired value for the brake-pressure regulating elements.

A conventional brake system is described in DE-43 35 769 C1. In the known four-circuit brake system, brake-pressure regulating elements are configured, on the one hand, as motor-driven single-circuit master cylinders and, on the other hand, as motor-driven pressure modulators. The pistons of these elements provide brake-pressure build-up which leads to the maximum pressure designed for the respective wheel brake. The reduction of this pressure again can be achieved in a single stroke of the respective piston. As a result, the pistons in combination with a pedal position sensor as the brake-pressure desired-value input element and with position sensors for the pistons of the brake-pressure regulating elements and/or brake-pressure transducers for the individual wheel brakes, achieve very accurate control of the brake pressure. Moreover, because of the individual controllability of the individual brake-pressure regulating elements, traction and vehicle-dynamics control functions can be implemented with great sensitivity.

Despite these functionally advantageous properties of the known brake system, however, one disadvantage of this system is to be regarded as the fact that the brake-pressure regulating elements take up a considerable amount of space. In particular, the electric drives, which must be very powerful in order to be able to displace the pistons of the brake-pressure regulating elements at high brake pressures to give a further increase in the brake pressure, make a significant contribution to this space problem.

It is, therefore, an object of the present invention to improve an electrohydraulic brake system such that, while retaining good functionality in terms of the ability to implement a very wide variety of control and regulation functions requiring a braking intervention (e.g. electronically controllable braking-force distribution, anti-lock and/or traction control and/or vehicle-dynamics control), is of significantly simpler and, especially, more space-saving construction and can also be manufactured more cheaply.

This object has been achieved according to the present invention by providing that the brake-pressure regulating elements each comprise a piston pump designed as a reciprocating positive-displacement machine, with at least one piston, which executes its filling and delivery strokes in a fixed phase relationship to a drive element of the pump which can be driven in rotation by the electric motor. The output of the pump per pump cycle is controlled in opposed monotonic correlation with the pressure prevailing in the respective wheel brake such that the output decreases when the pressure increases.

The maximum delivery volume per pump cycle which occurs within one revolution of the driving part is small relative to the output required to couple the maximum value of the brake pressure into the connected wheel brake and amounts to between $\frac{1}{20}$ and $\frac{1}{100}$ of this maximum output. Each wheel brake is assigned its own brake-fluid holding space into which brake fluid can be released in a metered manner via an electrically drivable valve arrangement. When the vehicle is stationary and the desired-value transmitter is actuated, the electrically drivable valve arrangement shuts off the brakes from the associated brake-fluid holding spaces and, when the desired-value input is reduced, allows the metered outflow of brake fluid from the brakes into the brake-fluid holding spaces.

Each of the brake-pressure regulating elements has a piston pump configured as a reciprocating positive-displacement machine. The pistons execute filling and delivery strokes in a fixed phase relationship to a drive element of the respective pumps which can be driven in rotation by the electric drive motor. The maximum delivery volume per pump cycle of the pump occurs within one revolution of the driving part and is small relative to the output $Q_{max}$ required to couple the maximum value of the brake pressure into the connected wheel brake, amounting to between $\frac{1}{20}$ and $\frac{1}{100}$ of this maximum output.

The output is controlled in opposed monotonic correlation with the pressure prevailing in the wheel brake, i.e. in opposition to the latter. In other words, the output decreases when the pressure increases. The electric motors provided to drive the pumps can be configured to have a significantly lower power, this being associated with a considerable reduction in the space requirement. The same applies mutatis mutandis to the pumps, the displacements of which can be significantly smaller than the displacement (cross-section times piston stroke) of a brake cylinder, which must be capable of forcing a relatively large quantity of brake fluid into the connected wheel brake in a single stroke. In the brake system according to the present invention, a particular quantity of brake fluid is divided between a multiplicity of pump cycles performed in rapid succession and involving a significantly smaller displacement volume. Because the pump cycles take place in rapid succession, with the delivery volume decreasing as the brake pressure increases, there is only slight pulsation during the pressure build-up. This is virtually unnoticeable for the driver, and the dynamic behavior of the vehicle is not impaired.

In order to permit a rapid brake-pressure reduction, each of the wheel brakes is assigned its own brake-fluid reservoir chamber, into which brake fluid can be released in a metered manner from the wheel brake by an electrically drivable valve which is driven into its shut-off position during the brake-pressure build-up. Brake fluid is pumped out of these reservoir chambers into the respectively connected wheel brakes in brake-pressure build-up phases.

For reasons of safety, it is advantageous to provide, in addition, an emergency braking device which can be actuated by the driver via a master cylinder. A currently preferred embodiment achieves this in a simple manner if two wheel brakes, preferably the front wheel brakes, are combined to form an emergency brake circuit which can be supplied with brake pressure by a single-circuit master cylinder and the wheel brakes of which can be shut off from the master cylinder. It being possible to use this single-circuit master cylinder, which is equipped with a displacement sensor, as a pedal-displacement simulator and as a desired-value input device for electrically controlled braking. The output signal of the displacement sensor is a measure of the actuating displacement of the brake pedal produced for the actuation of the master cylinder.

To this end, the master cylinder can, in a simple manner, be constructed such that a master cylinder pushrod, which accompanies the actuating stroke of the brake pedal, engages axially on a piston which is arranged displaceably in the housing of the master cylinder, forms a fluid-tight, axially movable limit of a top-up space for the output pressure space of the master cylinder and is supported via a piston spring against a piston which delimits in axially movable fashion the output pressure space of the master cylinder.

In a currently preferred embodiment of the brake system, the wheel brakes of the emergency brake circuit are each assigned a brake-fluid accumulator with an accumulator chamber which can be filled completely is provided as the reservoir for the wheel brakes of the emergency brake circuit. The capacity thereof corresponds at least to the volume of the quantity of brake fluid which must be displaceable into the wheel brake to achieve therein the maximum usable brake pressure, and is reducible by this volume. The configuration corresponds to the maximum volume of the accumulator chamber corresponding to the relaxed or stress-equalized state of a resilient wall or supporting element of the chamber which opposes a reduction in the volume of the chamber with a restoring force which is proportional thereto but always smaller than a force resulting from a pressure difference between the ambient pressure and the internal pressure in the chamber and acting to reduce the volume of the chamber.

The wheel brakes, which can be activated only by supplying electrical control signals to their brake-pressure regulating elements, are each assigned their own brake-fluid reservoir, which is held at ambient pressure. This prevents the brake-fluid reservoir of the emergency brake circuit from being completely emptied in an anti-lock control mode. The wheel brakes, which can be activated only by supplying electrical drive signals to their brake-pressure regulating elements, are each assigned their own brake-fluid reservoir, which is held at ambient pressure. This achieves the overall effect that the wheel brakes are hydraulically decoupled to the greatest possible extent, and any leak in one of the brakes cannot influence the serviceability of the others. The malfunctioning of the defective brake itself can be detected in a simple manner by electronic monitoring of the power consumption of the drive motor of its brake-pressure regulating element.

Electrically drivable 2/2-way solenoid valves provided for the control of brake-pressure reduction phases are advantageously constructed such that their excited position is the shut-off position and their through-flow position the starting position, in which there is a direct connection between the wheel brake and its reservoir chamber. In order to protect these valves from excessive heating of their control magnets in prolonged stationary phases of the vehicle in which the driver keeps the brake actuated to feed in a minimum braking force, it is advantageous if, in such stationary phases, the electronic control unit of the brake system provides a periodically alternating "shutdown" (deactivation) of two wheel brakes in each case, all the wheel brakes remaining active for a brief period in transitional phases.

The cooling which this makes possible of the switching magnets of the valves which have fallen back into their starting position can also be assisted by briefly supplying the pumps of the inactivated brakes with drive signals in order to generate a flow of brake fluid favorable for rapid heat dissipation.

In the case of alternating activation of wheel brakes in stationary phases of the vehicle, it has been found beneficial to combine one front brake and one rear brake in each case into respective wheel brake pairs that can be actuated alternately, these pairs preferably being the brakes of diagonally opposite vehicle wheels.

Here, it can also be advantageous if, in stationary braking with alternating use of two wheel-brake pairs, these are supplied with a higher brake pressure than would correspond to the desired-value input in the case of pedal actuation during the driving of the vehicle. The stationary braking mode can thus use the maximum brake pressure that can be developed by the brake-pressure regulating elements or, depending on the electronic control unit, a pressure which corresponds to twice the value resulting from the "desired value" input in order to achieve virtually the same braking action as that which the driver intends to bring about by the brake actuation.

Structural integration of the pressure-reduction control valve into the pump of the pressure regulating elements of the respective wheel brakes is achievable in a simple manner if this valve is a rotary-slide valve which has a valve body which rotates with the driving part of the pump and, within a small angular range, releases a flow path which connects the brake to its reservoir chamber.

The adjustability of the through-flow position of the pressure-reduction control valve required for this purpose can be achieved in a simple manner if one rotational-position sensor arrangement produces an output signal which is characteristic of the maximum value of the negative overlap of control edges of the valve body and control edges on the housing of the pressure reduction valve, and which also corresponds to the maximum cross-section of the flow path connecting the brake to its reservoir chamber. From the linking thereof, which, by way of an AND operation, with a drive control signal for the motor of the brake-pressure regulating element, a signal is obtained for stopping the drive motor in the rotational position of its rotor corresponding to the pressure-reduction position of the valve.

In combination with the foregoing, the brake-pressure holding function of the brake system can be simply achieved by the pressure-reduction control valve if a further rotational-position sensor arrangement is provided. The output signal of the sensor arrangement is characteristic of a situation where the position of the valve body of the valve provided to control pressure-reduction phases corresponds to the maximum overlap of control edges of the valve body and of the valve housing. This maximum overlap is associated with the tightest-possible shutting off of the wheel brake from its reservoir chamber. Such selection of pressure-holding or pressure-reduction functional positions of the control valve used for this purpose is possible at all times if the rotary drive of the driving part of the pump of the brake-pressure regulating element is self-locking, as in a preferred embodiment of the brake system.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
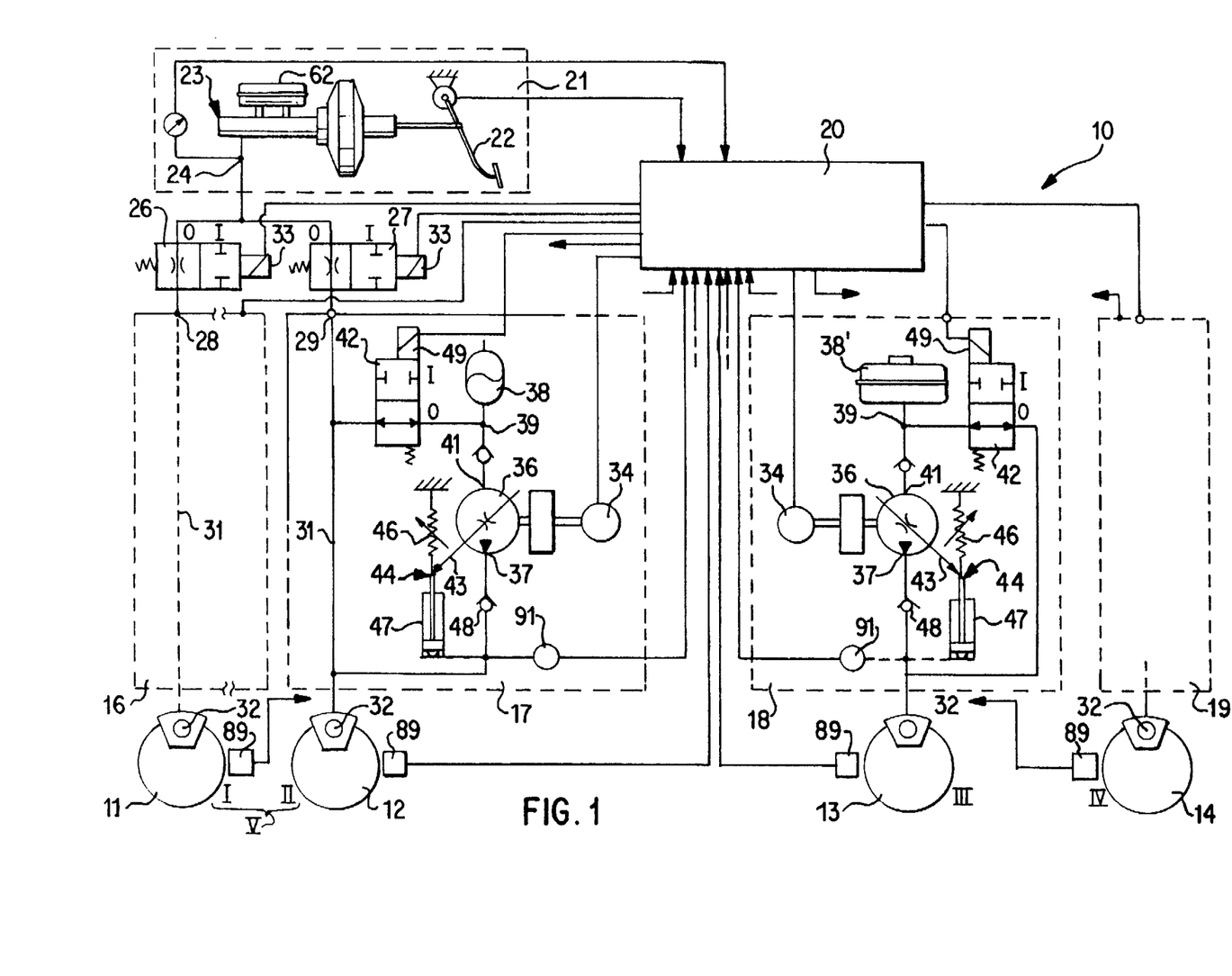
FIG. 1 is a schematic diagram of an electrohydraulic brake system according to the present invention, having electrically controllable high-pressure pumps constituting brake-pressure regulating elements which are assigned individually to the wheel brakes, and solenoid valves which are connected hydraulically in parallel to the said regulating elements for controlling brake-pressure reduction phases.

In the electrohydraulic brake system denoted generally by numeral 10 in FIG. 1, each wheel brake 11 to 14 forms, together with an electrohydraulic brake-pressure regulating element 16 to 19 assigned individually thereto, a respective "independent" brake circuit I–IV. Under the control of an electronic control unit 20, brake pressure in the brake circuits can both be developed in accordance with a driver's desire for vehicle deceleration and modification of the latter, a desire which can be fed in by a desired-value specifying device 21. Moreover, activation of the wheel brake(s) of an individual, more than one or all the brake circuits I to IV independently of the action of the driver, e.g. for the purpose of a traction control or vehicle-dynamics control operation, is possible insofar as such control operations require a brake intervention. The electronic control unit 20 is explained below with reference to its essential functions, a knowledge of which will allow a suitably trained person skilled in the art to construct this control unit 20 using conventional electronic circuitry.

In order to ensure the possibility of braking a vehicle with sufficient vehicle deceleration for the extreme situation where the on-board electrical system fails, the front-wheel brakes 11, 12 are also combined to form an emergency brake circuit V which can be activated independently of any electronic control of their respective electrohydraulic brake-pressure regulating components 16, 17 by a master cylinder 23 that can be actuated by a brake pedal 22. The master cylinder 23 is also used as a functional element of the desired-value specifying device 21.

Figure 2:
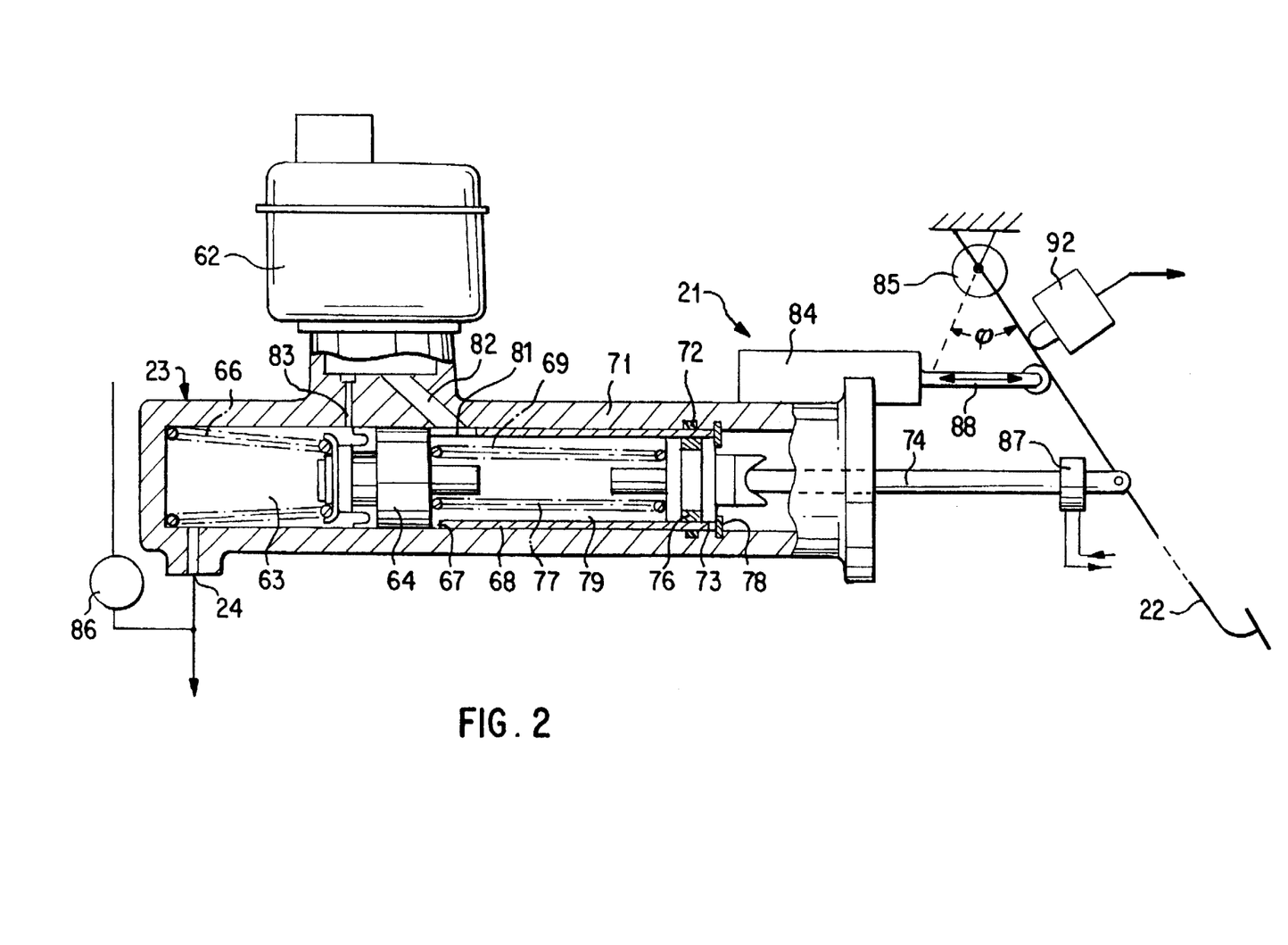
FIG. 2 is a simplified longitudinally sectional schematic view of a single-circuit master cylinder which is provided in the brake system of FIG. 1 as a desired-value specifying device for the control of brake-pressure build-up and brake-pressure reduction phases and by way of which the front-wheel brakes of the vehicle can be activated in an emergency braking mode.

As can be seen specifically from FIG. 2, the device 21 is a static single-circuit master cylinder which has only one pressure outlet 24, which is assigned jointly to the two front-wheel brakes 11, 12. The device 21 is connected via a respective changeover valve 26, 27, on one hand, to a pressure supply inlet 28 of the brake-pressure regulating element 16 of the left-hand front-wheel brake 11 and, on the other hand, to a pressure-supply inlet 29 of the brake-pressure regulating element 17 of the right-hand front-wheel brake 12. The inlets 28, 29 are connected directly, by way of wheel-brake lines 31, to the schematically shown wheel-brake cylinders 32 of the respective front-wheel brakes 11, 12.

The changeover valves 26, 27 are 2/2-way solenoid valves which can be controlled individually or jointly by output signals of the electronic control unit 20. Their starting position O, which is assumed when the control magnets 33 are in the deenergized state, is a through-flow position in which the pressure outlet 24 of the master cylinder 23 is in communication with the pressure-supply inlet 28 or 29 of the brake-pressure regulating element 16 or 17 of the respective front-wheel brake 11 or 12. Their excited position I, i.e. the position assumed when their control magnets 33 are excited by a respective output signal of the electronic unit 20, is a shut-off position, in which the respective brake-pressure regulating element 16 or 17 of the respective front-wheel brake 11 or 12 is shut off from the pressure outlet 24 of the master cylinder 23.

The brake-pressure regulating elements 16, 17 of the respective front-wheel brakes 11, 12 are of identical configuration, allowing the explanation of their structure in accordance with FIG. 1 to be limited to that of brake-pressure regulating element 17 which is assigned to the right-hand front-wheel brake 12.

Brake-pressure regulating element 17 comprises a high-pressure pump 36 which can be driven by an electric motor 34 controlled by the electronic control unit 20. The pressure outlet 37 of the pump 36 is connected to the brake calliper of the wheel brake 12, assumed here to be a disc brake. Element 17 further comprises a brake-fluid reservoir chamber 38 having a defined limit capacity and a supply connection 39 connected to the inlet connection 41 of the high-pressure pump 36, and a brake-pressure control valve 42 hydraulically in parallel with the high-pressure pump 36 and via which brake fluid can flow out of the wheel brake 12 into the brake-fluid reservoir chamber 38 in pressure reduction phases.

The high-pressure pump 36 is assumed to be a pump of the conventional type with a variable delivery rate, as an axial-piston swash plate pump or oblique-axis pump. The adjusting element of the pump 36 is shown schematically by an arrow 43 and is acted upon by an actuating drive, denoted generally by numeral 44 to provide automatic regulation of the delivery rate of the pump 36 such that its delivery rate decreases as the output pressure of the pump increases and reaches the value 0 at an output pressure which corresponds to a maximum value of the achievable brake pressure.

As illustrated in FIG. 1, an actuating drive 44 can be constructed by a prestressed compression spring 46, e.g. a spring with an adjustable prestress which urges the delivery-rate adjusting element 43 of the pump 36 into its functional position assigned to the maximum delivery rate. By way of an actuating cylinder 47, which likewise acts on the adjusting element 43 and is supplied with the output pressure of the pump as the driving pressure, the adjusting element 43 of the pump is adjusted counter to the increasing restoring force of the compression spring 46 so as to reduce the delivery rate of the pump. In the illustrated embodiment chosen to explain the principles of the present invention without being limited to the details, an outlet nonreturn valve 48 which prevents brake fluid from flowing back out of the wheel brake into the brake-fluid reservoir chamber 38 via the pump is arranged between the pressure outlet 37 of the pump and the wheel brake 12.

The high-pressure pump 36 and its drive motor 34 are sized and matched to one another such that the maximum value of the brake pressure of, for example, 200 bar can be built up within one second and approximately fifty 360° revolutions of the motor are required for this purpose. It is assumed that, as long as the pump 36 has to deliver against only a low pressure, it (i.e. the pump 36) has a delivery volume of approximately 0.2 cm³ per revolution of the motor and this decreases in an approximately linear manner as the pressure increases.

The brake-pressure control valve 42 is a 2/2-way solenoid valve which has as its starting position O a through-flow position, in which the supply connection 39 of the brake-fluid reservoir chamber 38 is connected to the wheel-brake line 31 and, upon excitation of its control magnet 49 with an output signal of the electronic control unit 20, moves into its shut-off position I, which is assigned to brake-pressure build-up and brake-pressure holding phases of an electronically controlled braking operation.

The brake-fluid reservoir chamber 38 of the brake-pressure regulating elements 16, 17 of the respective front-wheel brakes 11, 12 operable as an emergency brake circuit V are formed by the accumulator chambers of fluid accumulators 51 having a limited capacity corresponding approximately to twice to three times the volume of the quantity of brake fluid which must be forced into a front-wheel brake 11 or 12 in order to build up in the latter the maximum brake pressure corresponding to the capacity of the brake system 10.

Figure 3:
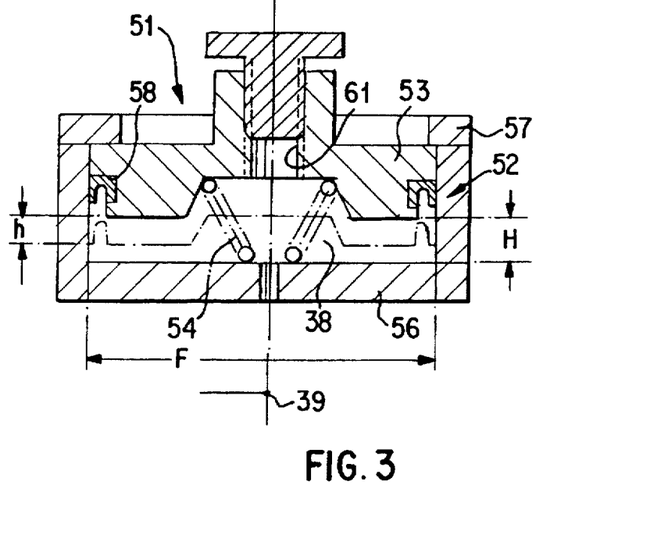
FIG. 3 is a longitudinally sectional schematic view of an accumulator element of defined maximum capacity suitable as a brake-fluid reservoir for the front-wheel brakes of the brake system of FIG. 1.

The specific embodiment in FIG. 3 illustrates the operation of this brake-fluid accumulator 51 which has a cylindrical housing 52 in the form of a shallow pot in which a piston 53 is arranged in such a way that it can be displaced axially in pressure-tight fashion. This piston is urged by a centrally arranged return spring 54 supported on the bottom 56 of the accumulator housing 52 into an upper end position, marked by contact with an annular stop 57 fixed to the housing corresponding to the maximum capacity of the accumulator 51.

The prestress of the return spring 54 is small but still sufficient in all positions of the piston 53 to overcome the friction caused by an annular seal 58 resistant to high pressure. The spring rate of the return spring 54 is likewise low and made such that the restoring force developed by the spring 54 in the position of the piston 53 corresponding to the minimum volume of the reservoir chamber 38 (indicated in dash lines) corresponds to only a small fraction of about ¹/₁₀ to ⅕ of the force resulting from the effective cross-sectional area F, multiplied by the ambient atmospheric pressure, with which the piston is exposed on one side, from the outside, to the ambient atmospheric pressure.

The foregoing ensures that the internal pressure in the accumulator chamber 38, which is completely filled with brake fluid, cannot fall below a value of at least 0.8 bar, at which reliable operation of the high-pressure pump 36 is guaranteed, and it also prevents the formation of bubbles in the accumulator chamber 38 which could lead to a reduction in the quantity of brake fluid that can be used in the electrically controlled braking mode. This latter quantity must be capable of being taken only from the accumulator 51 in the electrically controlled braking mode. The piston 53 is provided with a bleeder hole 61 which can be sealed off in a pressure-tight manner.

The brake-pressure regulating elements 18, 19 provided for the rear-wheel brakes differ from the brake-pressure regulating elements 16, 17 of the front-wheel brakes only in that the fluid accumulator 51 is replaced by "normal" brake-fluid reservoirs 38' which are permanently subject to the ambient atmospheric pressure and can contain any desired reserve of brake fluid. This reserve corresponds, given conventional dimensioning of the reservoirs 38', to approximately three to five times the maximum swallowing capacity of the rear-wheel brakes 13, 14. The same applies, mutatis mutandis, to the reservoir 62 of the master cylinder 23 of the desired-value specifying device 21 which, in the normal braking mode, being controlled by the control unit 20, produces desired brake-pressure value signals of a level and/or frequency which are a measure of the vehicle retardation and correspond to the instantaneous driver's desire in this regard. In emergency-braking mode, the reservoir 62 operates as a brake booster with an output pressure space 63, as seen in FIG. 2, building up the brake pressure that can be coupled into the front-wheel brakes 11, 12 by pedal-controlled displacement of a master-cylinder piston 64 delimiting this output pressure space 63 in an axially movable manner.

In the starting position shown in FIG. 2 and corresponding to the unactuated state of the brake system, the master-cylinder piston 64 is biased or urged, by a return spring 66 arranged within the output pressure space 63, into contact with the piston-facing narrow annular end face 67 of a thin-walled supporting tube 68 which is inserted in a manner secure against axial displacement and, in a manner known but not shown, against rotation into the elongate housing bore 69, open towards the brake pedal 22, of the master-cylinder housing 71. The annular end face 67 forms the stop which marks the starting position of the master-cylinder piston 64. At its pedal-facing end, the supporting tube 68 is sealed off from the housing 71 of the master cylinder 23 by an annular seal 72.

An actuating piston 73 is arranged in the supporting tube 68 so as to be axially displaceable in a guided manner by a push rod 74 acting thereon, by pivoted actuation of the pedal 22. The actuating piston 73 is sealed off from the supporting tube 68 by an annular seal 76 fixed to the piston.

In the illustrated starting position of the actuating piston 73, that corresponding to the maximum axial distance S of the actuating piston 73 from the master-cylinder piston 64, the actuating piston 73 is held in contact by a weakly prestressed helical compression spring 77 with a stop 78 configured as a snap ring inserted firmly into the pedal end of the cylinder bore 69. This marks the starting position of the actuating piston 73, i.e. the position assigned to the unactuated state of the master cylinder 23. The prestress of the return spring 66 arranged in the output pressure space 63 is somewhat greater than that of the helical compression spring 77 arranged in the space 79 extending between the master cylinder piston 64 to ensure that both pistons 64, 73 assume the illustrated position in the unactuated state of the master cylinder 23.

The space 79 extending between the master cylinder piston 64 and the actuating piston 73 is in permanent communication, via an opening 81 in the supporting tube 68, with a top-up hole 82 in the cylinder housing 71 and hence in communication with the reservoir 62 of the master cylinder 23 and also, in the illustrated starting position of the master-cylinder piston 64, via a balance hole represented as a snifter hole 83. The communication between the output pressure space 63 and the reservoir 62 of the master cylinder 23 is shut off after a short stroke of the master-cylinder piston 64 performed by the latter at the beginning of a braking operation.

The axial distance S which the master-cylinder piston 64 and the actuating piston 73 assume from one another in their respective starting positions is advantageously chosen to be somewhat greater than the stroke which the actuating piston 73 must perform in the direction of the master-cylinder piston 64 to feed in a maximum brake pressure.

The desired-value specifying device 21 is provided with at least one sensor 84, 85, 86 or 87, which produces an electrical output signal that is fed to the electronic control unit 20 and is a measure of the vehicle retardation which the driver wishes to attain by actuating the brake pedal 22. Suitable sensors in this respect can be a "linear" displacement measuring system 84, the output signal of which varies monotonically with the displacement of a feeler 88 which can be displaced in a manner guided in its longitudinal direction and is supported in the manner illustrated so as to slide on the brake pedal 22. Alternatively, the sensors can be an angular position ($\phi$) transducer 85, e.g. a rotary potentiometer, the output signal of which is linked in an unambiguous manner with the angular position of the brake pedal 22, or a pressure transducer 86, the output signal of which is a measure of the pressure prevailing in the output pressure space 63 of the single-circuit master cylinder 23, or a force transducer 87, the output signal of which is a measure of the force with which the driver actuates the brake pedal 22 and pivots the latter against the restoring force of the helical compression spring 77 acting on the actuating piston 73, whereby the spring acts as a displacement simulator.

As seen in FIG. 1., the vehicle is fitted with wheel-speed sensors 89 which are assigned individually to the vehicle wheels and produce electrical output signals. The level and/or frequency of each of the sensors 89 is a measure of the peripheral speed of the respective vehicle wheel. The output signals of these wheel speed sensors 89 are fed to the electronic control unit 20 at separate inputs as information input signals. The signals are differentiated with respect to time in the electronic control unit 20 to also obtain the information on retardation behavior of the vehicle wheels during a braking operation.

In addition to, or as an alternative, to such wheel speed sensors 89, it is also within the scope of the present invention for brake pressure sensors 91 assigned individually to the vehicle wheels to be provided. The electrical output signals of the sensors 91 measure the brake pressures prevailing in the wheel-brake cylinders 32 of the respective wheel brakes 11 to 14 and are fed to the electronic control unit 20 at separate information inputs.

The output signals of the wheel speed sensors 89 and/or brake-pressure sensors 91 contain, fundamentally, the information on the actual values of the respective wheel retardations and are therefore suitable for comparison with the desired value of the vehicle retardation which the driver feeds in by actuating the desired-value specifying device 21. Thereby, drive signals for the electric drive motors 34 of the pumps 36 can be obtained from such an actual/desired value comparison which signals, in the form of follow-up control, allow rapid matching of the desired value and actual value of the wheel or vehicle retardation.

In its normal, electrically controlled operating mode, the brake system 10 explained thus far as regards its structure and functional properties of its individual components is operated in the following manner. As soon as the driver actuates the desired-value specifying device 21 via the brake pedal 22, this actuation being detected by the electronic control unit 20 from the occurrence of a desired-value signal from one or more of the sensors 84 to 87 and/or from the occurrence of an output signal from the customary brake-light switch 92, the changeover valves 26, 27 assigned to the respective front-wheel brakes 11, 12 are switched to their shut-off positions I. The electrohydraulic regulating elements 16, 17 of the front-wheel brakes 11, 12 are thereby shut off from the master cylinder 23. At the same time or with a slight delay relative thereto, the brake-pressure control valves 42 of the electrohydraulic brake-pressure regulating elements 16 to 19 are switched to their shut-off positions I, and the electric motors 34 of the pumps 36 are supplied with drive signals. As a result, the pumps 36 enter into brake-pressure build-up operation.

From time differentiation of the output signals of the wheel speed sensors 89 and from comparison thereof, the electronic control unit detects when the vehicle retardation, detectable from the wheel retardations, coincides with the desired value fed in by the driver, taking into account, of course, a brake slip which is likewise detectable from the output signals of the wheel speed sensors 89. The supply of drive signals to the pump drives 34 is interrupted as soon as the actual values of the wheel retardations have a value correlated with the desired value fed in for the vehicle retardation. The brake-pressure regulating elements 16 to 19 are here controlled so that the wheel retardations of the front wheels are the same and the wheel retardations of the rear wheels are likewise the same. The absolute value $b_v$ of the front-wheel retardation and the absolute value $b_H$ of the rear-wheel retardation can be different.

It may, for example, be advantageous at relatively low vehicle retardations in the partial braking range to assign to the rear-wheel brakes 13, 14 a greater role in the development of the braking force than in the full braking range in order to spare the front-wheel brakes 11, 12, which, in the full braking range, have to make the predominant contribution to the development of the braking force because of the resulting dynamic shift in the axle load, and overall to achieve more uniform brake wear.

The electronic control unit 20 can also be constructed with the ability to control the brake-pressure regulating elements 16 to 19 such that, in the overwhelming majority of the range of possible vehicle retardations, identical values for the wheel retardations at the front-wheel brakes result from the rear-wheel brakes. This corresponds in principle to equal utilization of the coefficient of friction at all the vehicle wheels and, in this respect, to the ideal braking force distribution.

As soon as it can be detected from the output signals of the wheel-speed sensors 89 that the actual value of the vehicle retardation corresponds to the desired value fed in, the operation of the pumps 36 is interrupted.

A brake-pressure reduction is intended, for example, to act only on one wheel brake, when the driver partially releases the brake pedal 22 so as to lower the desired value of the vehicle retardation or fully releases it for the purpose of ending the braking operation, with the brake pressure being lowered at all the wheel brakes 11 to 14, or for the purpose of an anti-lock control operation. This reduction is performed by switching the brake-pressure control valves 42 to their open starting position O, allowing brake fluid to leave the wheel-brake cylinders 32 and, in the front-wheel brakes, flow off into the reservoir chambers 38 of limited capacity or, with the rear-wheel brakes 13, 14, into the reservoirs 38' assigned individually thereto. The rate of change of the brake pressure can be varied within wide limits by periodic pulse-controlled switching back of the brake-pressure control valves to their shut-off position I.

An anti-lock control operation can become necessary in the course of an electrically controlled braking operation and is performed in accordance with the same criteria and algorithms as those universally known from the technology of anti-lock control systems. The output signals of the wheel speed sensors 89 are used, which signals contain the information on the dynamic behavior of the vehicle wheels, via the brake-pressure regulating elements 16 to 19, which can be controlled independently of one another.

Because of the individual controllability of the brake-pressure regulating elements 16 to 19 assigned individually to their vehicle wheels, the brake system 10 can also be used to perform the functions of the vehicle-dynamics control. The control can, for example, require the activation of just one wheel brake. The brake system can also be used for electronically controlled braking-force distribution which may require different brake pressures to be coupled into the front-wheel brakes 11, 12 and the rear-wheel brakes 13, 14. It is advantageous here, particularly for the braking-force distribution control, to provide the pressure sensors 91 assigned individually to the wheel brakes 11 to 14. The output signals of these sensors allow accurate recording of the pressures prevailing at the front-wheel brakes 11, 12 and the rear-wheel brakes 13, 14.

If the on-board electrical system fails, the changeover valves 26, 27 and the brake-pressure control valves 42 fall back into their starting position O, (i.e., their respective through-flow positions). As a result, although the rear-wheel brakes 13, 14 become depressurized, the front-wheel brakes 11, 12 are subjected to brake pressure by actuation of the master cylinder 23 via the brake pedal 22. Although this results in lengthening of the pedal travel because it is now not only the actuating piston 73 but also the master-cylinder piston 64 which undergoes a displacement, this is acceptable given the gain in safety.

Figure 4:
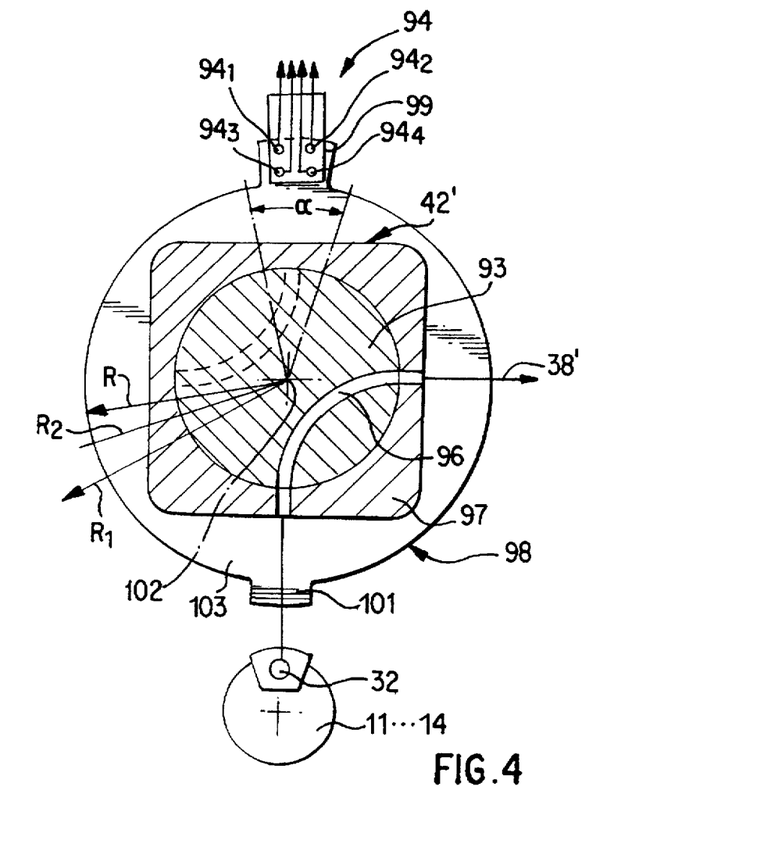
FIG. 4 is a sectional schematic view of a rotary-slide valve which can be utilized in the brake system of FIG. 1 as a brake-pressure control valve, can be controlled by the drive of the high-pressure pumps and can have its position monitored electronically.

Finally, for the purpose of explaining a structurally simple implementation of brake-pressure control valves 42 which is possible at least in the case of the rear-wheel brakes 13, 14, which are not involved in the emergency-braking function, reference will be made to the schematic illustration of FIG. 4. The brake-pressure control valve 42' is a rotary-slide valve having a valve body 93 which is also driven by the drive motor 34 and, within a 360° rotation, moves into a functional position as seen in FIG. 4 in which the connected wheel brake is pressure-relieved towards the reservoir 38' only within a small angular range α. In all other azimuthal positions of the valve body 39 outside this small angular range α, the valve is located with particularly good leak-tightness in the shut-off position seen in dashed lines, which lies diametrically opposite the through-flow functional position, and exercises a shut-off function.

By way of a position sensor arrangement 94, the position of the valve body 93 in the through-flow position of the valve 42' or in the shut-off position can be detected, and the respective characteristic output signal of the position sensor arrangement 94 can be used to stop the electric drive motor 34 of the respective brake-pressure regulating device 18 or 19. On one hand, such a valve 42' which, with each revolution of the motor 34, briefly establishes a tank connection between the wheel-brake cylinder 32 and the reservoir 38', somewhat reduces the delivery rate of the pump 36 driven by the same motor 34. On the other hand, it is easy to ensure, by using a small azimuthal opening width for the through-flow passage 96 of the valve body 93, that a reduction in the delivery rate due to the periodic connection of the brake to the reservoir remains within acceptable limits.

In the specific embodiment shown in FIG. 4, the position sensor arrangement 94 provided to monitor the through-flow position and the shut-off position of the rotary-slide valve 43' comprises a winged disc designated generally by numeral 98 which is connected for rotation in common with the valve body 93 or the shaft of the drive motor, is arranged outside the valve housing 97 and has a main body in the form of a circular disc, projecting radially from the edge of which are two sector-shaped wings 99, 101. The wings 99, 101 are arranged diametrically opposite one another with their azimuthal extent in relation to the axis of rotation 102 of the valve body 93 somewhat smaller than the angular range α within which communication between the wheel-brake cylinder 32 of the connected wheel brake and the reservoir 38' can exist via the rotary-slide valve 42' with variation in the size of the cross-section of flow exposed.

The position sensor arrangement 94 comprises a total of four detector elements $94_1$, $94_2$, $94_3$, $94_4$ which are fixedly arranged relative to the housing 97 and their radial distances $R_1$, $R_2$ from the axis of rotation 102 of the winged disc 98 differ pairwise and are greater than the radius R of the circular-disc-shaped main body 103 of the winged disc 98. The sensor elements $94_1$ to $94_4$ which, for the purpose of explanation, are constructed as contactlessly operating, e.g. inductive, proximity switches, are arranged so that the radially outer sensor elements $94_1$ and $94_2$ can move into an overlapping arrangement only with the peripheral region of the detector wing 99, which has a larger radius than the other detector wing 101, but not with the latter, while the radially inner sensor elements $94_3$ and $94_4$ can come into an overlapping arrangement with both sector-shaped wings 99, 101. Thus, the output-signal combination of the detector arrangement 94 differs in a characteristic manner depending on which sector-shaped wing 99 or 101 is in surface overlap with four or just two sensor elements.

If the output signal of all four sensor elements $94_1$ to $94_4$ is the same, this indicates that the valve 42' is in its open position. However, if the output signal of the radially inner sensor elements $94_3$ and $94_4$ is the same and the radially outer sensor elements $94_1$ and $94_2$ are different therefrom, this indicates that the valve 42 is in its dashed-line shut-off position.

Although the invention has been described and illustrated in detail, it is to be clearly understood that the same is by way of illustration and example, and is not to be taken byway of limitation. The spirit and scope of the present invention are to be limited only by the terms of the appended claims.

What is claimed is:

1. Electrohydraulic brake system for a road vehicle, having wheel brakes in which each wheel brake is assigned a brake-pressure regulating element arranged to be actuatable by supplying drive signals to an electric motor and, together with the respective wheel brake comprises a wheel-brake circuit and, at least one electronic or electromechanical signal transmitter is configured to be actuatable by a vehicle driver to specify a required desired value of the retardation of the road vehicle and produces an electrical output signal correlated monotonically with at least one of the force and the stroke with which the vehicle driver actuates the transmitter, and an electronic control unit is provided which, from comparison of the desired-value input signals with actual-value signals characteristic of the vehicle retardation, produces actuating signals required for rapid matching of the actual value to the target desired value for the brake-pressure regulating elements wherein the brake-pressure regulating elements each comprise a piston pump configured as a reciprocating positive-displacement machine, with at least one piston, which executes filling and delivery strokes in a fixed phase relationship to a driving part of the pump which can be rotationally driven by the electric motor; an output of the pump per pump cycle is controllable in opposed monotonic correlation with pressure prevailing in the respective wheel brake such that the output decreases when the pressure increases; a maximum delivery volume per pump cycle which occurs within one revolution of the driving part is small relative to an output required to couple a maximum value of the brake pressure into the connected wheel brake and amounts to between 1/20 and 1/100 of the maximum output; each wheel brake is assigned a brake-fluid holding space into which brake fluid can be released in a metered manner via an electrically drivable valve arrangement; and the electrically drivable valve arrangement is configured to shut off the brakes from the associated brake-fluid holding spaces when the vehicle is stationary and the desired-value transmitter is actuated, and, when the desired-value input is reduced, to allow the metered outflow of brake fluid from the wheel brakes into the brake-fluid holding spaces.

2. The brake system according to claim 1, wherein an emergency braking device is operatively arranged to be actuatable by the vehicle driver via a master cylinder.

3. The brake system according to claim 2, wherein two wheel brakes are combined to form a brake circuit so as to be selectively suppliable with pressure via the master cylinder.

4. The brake system according to claim 3, wherein the holding spaces for the wheel brakes of the emergency braking circuit are each formed by an accumulator chamber of a respective brake fluid accumulator, said chamber being sized so as to be capable of being completely filled and its capacity corresponding at least to a volume of quantity of brake fluid displaceable into the wheel brake to achieve maximum usable brake pressure and being reducible by the volume, whereby the state corresponding to the maximum volume of the respective accumulator chamber is one of a relaxed and stress-equalized state of a respective resilient wall and supporting element of the accumulator which opposes a reduction in the volume of the chamber with a restoring force which is proportional thereto but smaller than a force resulting from a pressure difference between the ambient pressure and the internal pressure in the accumulator chamber and acting to reduce the volume of the chamber, and the wheel brakes actuatable only by supplying electrical control signals to the respective brake-pressure regulating elements, are each assigned as holding space of an associated ambient pressure brake-fluid reservoir.

5. The brake system according to claim 4, wherein the master cylinder is a single-circuit master cylinder provided with a displacement sensor configured to an output signal which is characteristic of actuating displacement of the brake pedal provided for the actuation of the master cylinder and constitutes a desired-value input signal to the electronic control unit.

6. The brake system according to claim 5, wherein a pushrod of the master cylinder accompanies the actuating stroke of the brake pedal and engages axially on a piston arranged displaceably in a housing of the master cylinder, whereby the pushrod forms a fluid-tight, axially movable limit of a top-up space for output pressure space of the master cylinder and is supported via a piston spring against a piston delimiting an output pressure space of the master cylinder in an axially movable manner.

7. The brake system according to claim 2, wherein the master cylinder is a single-circuit master cylinder provided with a displacement sensor configured to an output signal which is characteristic of actuating displacement of the brake pedal provided for the actuation of the master cylinder and constitutes a desired-value input signal to the electronic control unit.

8. The brake system according to claim 7, wherein two wheel brakes are combined to form a brake circuit so as to be selectively suppliable with pressure via the master cylinder.

9. The brake system according to claim 7, wherein a pushrod of the master cylinder accompanies the actuating stroke of the brake pedal and engages axially on a piston arranged displaceably in a housing of the master cylinder, whereby the pushrod forms a fluid-tight, axially movable limit of a top-up space for output pressure space of the master cylinder and is supported via a piston spring against a piston delimiting an output pressure space of the master cylinder in an axially movable manner.

10. The brake system according to claim 1, wherein the electrically drivable valve arrangement operative to control brake-pressure reduction phases and assigned individually to the wheel brakes as 2/2-way solenoid valves have a shut-off position as the excited position and a starting position as the through-flow position whereby the solenoid valves provide, in the starting position thereof, a direct connection between the wheel brakes and the holding spaces individually assigned thereto.

11. The brake system according to claim 1, wherein, in stationary phases of the road vehicle during which the brake system is actuated, the electronic control unit of the brake system periodically alternatingly deactivates two wheel brakes constituting a pair, with all the wheel brakes being activated briefly in transitional phases.

12. The brake system according to claim 11, wherein, in the stationary phases of the road vehicle, the electronic control unit produces output signals which drive the pumps of nonactivated wheel brakes at intervals.

13. The brake system according to claim 11, wherein one front wheel brake and one rear wheel brake are combined to constitute one of the alternately actuatable wheel-brake pairs.

14. The brake system according to claim 13, wherein, in the stationary phases of the road vehicle, the electronic control unit produces output signals which drive the pumps of nonactivated wheel brakes at intervals.

15. The brake system according to claim 11, wherein, during the stationary phase of the vehicle, the alternatively actuatable wheel brakes are suppliable with an increased brake pressure having a magnitude approximately twice a magnitude resulting from the desired-value input.

16. The brake system according to claim 11, wherein the rotary drive of the driving part of the pumps of the brake-pressure regulating elements is configured to be self-locking.

17. The brake system according to claim 16, wherein, in the stationary phases of the road vehicle, the electronic control unit produces output signals which drive the pumps of nonactivated wheel brakes at intervals.

18. The brake system according to claim 1, wherein a pressure-reduction control valve of the electrically drivable control-valve arrangement is integrated into the pump of the respective brake-pressure regulating element and is a rotary-slide valve having a valve body rotatable with the driving part of the pump and, within a small angular range, releases a flow path which connects the brake to an associated holding space.

19. The brake system according to claim 18, wherein at least one rotational position sensor arrangement is configured to produce an output signal which is characteristic of maximum value of negative overlap of control edges of the valve body and control edges on the housing of the pressure reduction control valve and which also corresponds to a maximum cross-section of the flow path connecting the brake to its associated holding space, whereby from the linking of the output signal, via an AND operation, with a drive control signal for the electric motor of the brake-pressure regulating element a signal for stopping the drive motor in the rotational position of a rotor thereof corresponding to a pressure-reduction position of the pressure-reduction control valve is obtainable.

20. The brake system according to claim 19, wherein an additional rotational-position sensor arrangement provides an output signal is characteristic of a situation where the position of the valve body of the pressure-reduction control valve provided to control pressure-reduction phases corresponds to a maximum overlap of control edges of the valve body and of the valve housing, whereby this latter, maximum overlap is associated with a tightest-possible shutting off of the wheel brake from an associated holding space.

* * * * *